(12) United States Patent
Rhodes et al.

(10) Patent No.: US 8,577,288 B2
(45) Date of Patent: Nov. 5, 2013

(54) SUBSEA TRANSFER SYSTEM PROVIDING WIRELESS DATA TRANSFER, ELECTRICAL POWER TRANSFER AND NAVIGATION

(75) Inventors: Mark Rhodes, West Lothian (GB); Brendan Peter Hyland, Edinburgh (GB); Andrew Jaffrey, Turriff (GB)

(73) Assignee: WFS Technologies Ltd., Edinburgh (GB)

( * ) Notice: Subject to any disclaimer, the term of this patent is extended or adjusted under 35 U.S.C. 154(b) by 321 days.

(21) Appl. No.: 13/005,755

(22) Filed: Jan. 13, 2011

(65) Prior Publication Data
US 2011/0177779 A1 Jul. 21, 2011

(51) Int. Cl.
H04B 13/02 (2006.01)

(52) U.S. Cl.
USPC ........ 455/40; 455/9; 455/14; 455/72; 455/96; 455/98; 367/131; 367/133; 367/134; 340/850; 114/21.1; 114/51; 114/322

(58) Field of Classification Search
USPC .......... 455/40, 9, 72, 96, 98, 14; 114/322, 51, 114/21.1; 367/131, 133, 134; 340/850
See application file for complete search history.

(56) References Cited

U.S. PATENT DOCUMENTS

| 6,698,376 | B2* | 3/2004 | Delahousse et al. | 114/322 |
|---|---|---|---|---|
| 7,000,560 | B2* | 2/2006 | Wingett et al. | 114/322 |
| 7,327,705 | B2* | 2/2008 | Fletcher et al. | 370/331 |
| 7,711,322 | B2* | 5/2010 | Rhodes et al. | 455/40 |
| 7,742,007 | B2* | 6/2010 | Rhodes et al. | 343/719 |
| 7,831,205 | B2* | 11/2010 | Jack et al. | 455/40 |
| 7,854,569 | B1* | 12/2010 | Stenson et al. | 405/188 |
| 8,045,919 | B2* | 10/2011 | Rhodes et al. | 455/40 |
| 8,219,024 | B2* | 7/2012 | Rhodes et al. | 455/40 |
| 8,315,560 | B2* | 11/2012 | Rhodes et al. | 455/40 |
| 8,326,220 | B2* | 12/2012 | Rhodes et al. | 455/40 |
| 8,340,526 | B2* | 12/2012 | Camilli et al. | 398/104 |
| 2006/0286931 | A1 | 12/2006 | Rhodes et al. | 455/40 |
| 2007/0297290 | A1 | 12/2007 | Vosburgh | 367/131 |
| 2008/0001696 | A1 | 1/2008 | Coulson | 336/115 |
| 2008/0006197 | A1* | 1/2008 | Lambertus et al. | 114/313 |
| 2009/0208219 | A1 | 8/2009 | Rhodes et al. | 398/104 |

FOREIGN PATENT DOCUMENTS

| GB | 2467224 | 7/2006 | ............ H04B 13/00 |
| GB | 2453645 | 4/2009 | ............ B63G 8/00 |
| GB | 2441993 | 7/2009 | ............ H04B 13/02 |
| GB | 2464985 | 5/2010 | ............ B25J 19/04 |
| JP | 1990032721 | 7/1988 | ............ H02J 5/00 |
| SE | 2004/088351 | 10/2004 | ............ G01S 5/16 |
| WO | 2006/134327 | 12/2006 | ............ G01S 5/02 |

* cited by examiner

*Primary Examiner* — Marceau Milord
(74) *Attorney, Agent, or Firm* — Paul Davis; Mintz Levin (57) ABSTRACT

The present invention relates to a transfer system for providing wireless data transfer, electrical power transfer and navigation between a mobile subsea vehicle and a deployed subsea station that uses acoustic and electromagnetic carrier signals for wireless communication and navigation. An inductive connector is provided for power transfer between mobile subsea vehicle and a deployed subsea station without conductive contact.

22 Claims, 9 Drawing Sheets

SUBSEA TRANSFER SYSTEM PROVIDING WIRELESS DATA TRANSFER, ELECTRICAL POWER TRANSFER AND NAVIGATION

CROSS-REFERENCE TO RELATED APPLICATIONS

This application claims the benefit of UK Patent Application No. GB1000662.5, filed Jan. 15, 2010, entitled "Subsea Wireless Communication, Navigation and Power System" which is hereby incorporated herein by reference.

FIELD OF USE

The present invention relates to a subsea wireless communication, navigation and power system. More particularly, the present invention relates to a subsea wireless communication, navigation and power system that uses acoustic and electromagnetic carrier signals for wireless communication and navigation. An inductive connector is provided for the transfer of power between units without conductive contact.

DESCRIPTION OF THE RELATED ART

Establishing wireless communications underwater is widely recognised as being very challenging. While radio systems dominate atmospheric wireless communications applications, radio waves are attenuated severely in water with acoustic carriers being commonly adopted for long range underwater wireless communications.

Acoustic systems typically offer up to 10 kbps data rate and can achieve a range of many kilometers. Comparatively short wavelengths allow use as an accurate navigation and positioning aid. However, their horizontal range is more limited due to refraction effects caused by the vertical pressure gradient within a body of water. Acoustic links are also problematic in shallow water or restricted volumes of water due to multi-path reflections, air bubbles and acoustic noise. Similarly, acoustic links are degraded by noise and interference from a number of sources and are also subject to multi path effects and in some environments are virtually unusable.

Water, and particularly sea water, are partially conductive and in this medium, radio attenuation increases rapidly with frequency. Consequently, sub-sea radio communications systems tend to operate at very low frequencies to maximize operational range. Sub-sea radio communications systems typically operate below 10 MHz and offer communications up to 100 bps at 10's of meters range or 1 Mbps at 1 m range. Radio propagation is not degraded in any of the operating conditions which present difficulties for acoustic systems providing a very complimentary set of operating conditions. Furthermore radio signalling provides several advantages such as its ability to cross the water to air boundary allowing long range horizontal communication using air path, water to air or land without a surface repeater. Similarly, radio signalling when applied to navigation, sensing and communications systems are unaffected by pressure gradient thus allowing horizontal propagation. Furthermore electromagnetic signalling is immune to acoustic noise and allows transmission of high data rates at short range.

In under water applications, water must be excluded from conductive contacts of connectors to prevent short circuits due to the partially conductive nature of water. Inductive power transfer techniques are therefore beneficial and allow isolation of connectors from the surrounding partially conductive water. For example, a docked Autonomous Underwater Vehicle (AUV) may need to be re-charged or units such as data loggers may require re-charging while deployed.

There is therefore a need for a robust and reliable subsea wireless data and power transfer system that incorporates short-range high bandwidth radio-frequency (RF), mid-range low bandwidth RF and long-range low bandwidth acoustic communication and navigation/location capabilities.

There is also a need for a robust and reliable means of allowing an Underwater Vehicle to be effectively navigated towards subsea equipment to allow data collection, transfer of configuration settings and re-charging of power supplies. There is also a need for a robust and reliable means of allowing such interaction between an Underwater Vehicle and Remote subsea equipment to occur wirelessly.

SUMMARY OF THE INVENTION

In one aspect, the present invention relates to a subsea transfer system for providing wireless data transfer, electrical power transfer and navigation between a mobile subsea vehicle and a deployed subsea station and comprises a mobile subsea vehicle further comprising a first acoustic transceiver for providing wireless data communications and/or positioning signaling, a first radio transceiver for providing wireless data communications and/or position signaling, a first inductive power connector and a first data processor for controlling interaction between said first acoustic transceiver, said first radio transceiver and said first inductive power connector, and a subsea station further comprising a second acoustic transceiver for providing wireless data communications and/or positioning signaling, a second radio transceiver for providing wireless data communications and/or position signaling. Further, a second inductive power connector is provided and a second data processor for controlling interaction between said second acoustic transceiver, said second radio transceiver and said second inductive power connector and wherein, during use, first and second inductive power connectors allow transfer of electrical power between said mobile subsea vehicle and said subsea station and further wherein, during use, said first and second data processors are operable to select between said acoustic transceiver system or said radio transceiver system for use in data communications and/or navigation based on the quality of service available from each transceiver, and further wherein, during use, navigation data provided by radio and/or acoustic transceivers is operable to achieve docking of said inductive power transfer system.

The subsea transfer system of the present invention provides a robust and reliable means of allowing interaction between a mobile subsea vehicle and a subsea station with such interaction occurring wirelessly. Moreover, the present invention allows selection of radio or acoustic data transfer based on a comparison of the measured bit error rates of the two transceiver systems and further wherein selection of radio or acoustic data transfer is based on the range of operation between said mobile subsea vehicle and said subsea station and further wherein selection of radio or acoustic navigation is based on the range of operation between said mobile subsea vehicle and said subsea station. In another aspect of the present invention, selection of radio or acoustic navigation is based on a comparison of the measured received signal strength of the two transceiver systems. In another aspect of the present invention, selection of radio or acoustic navigation is based on the positional accuracy required between said mobile subsea vehicle and said subsea station. Preferably, said radio transceiver system and said acoustic transceiver system are operable to transfer data simultaneously and furthermore said radio transceiver system and said acoustic transceiver system are operable to provide navigation data simultaneously. In another aspect of the present invention, said radio and acoustic transceiver systems provide variable data rate communications. In detail, said acoustic transceiver system operates using acoustic signals with a frequency between 1 kHz and 100 kHz and furthermore said radio transceiver system operates using radio signals with a frequency between 1 Hz and 100 MHz. Typically, said acoustic transceiver system provides communications and/or navigation signaling at a range up to 10 km and typically, said radio transceiver system provides communications and/or navigation signaling at a range up to 1 km.

In another aspect of the present invention, said mobile subsea vehicle is operable to provision wireless data transfer, electrical power transfer and navigation to multiple subsea stations and furthermore said mobile subsea vehicle is operable to provision wireless data transfer, electrical power transfer and navigation to a subsea station that is in communication with a surface station.

Optionally, said mobile subsea vehicle is operable to transfer electrical power to said subsea station, is operable to receive electrical power from said subsea station and is operable to transfer data to said subsea station and is further operable to receive data from said subsea station. In yet another aspect of the present invention, said subsea station further comprises at least one remotely deployed sensor. The subsea transfer system according to the present invention may optionally further utilise radio data communication between said mobile subsea vehicle and said subsea station with said radio signals at least partially being passed through the seabed.

Furthermore, the present invention provides a method for providing wireless data transfer, electrical power transfer and navigation between a mobile subsea vehicle and a deployed subsea station by guiding said mobile subsea vehicle towards said subsea station based on data provided by an acoustic transceiver subsystem and/or a radio transceiver subsystem to achieve docking of an inductive power transfer subsystem.

BRIEF DESCRIPTION OF DRAWINGS

A better understanding of the features and advantages of the present invention will be obtained by reference to the following detailed description that sets forth illustrative embodiments by way of example only, in which the principles of the invention are utilized, and the accompanying drawings of which.

DETAILED DESCRIPTION OF THE INVENTION

Figure 1:
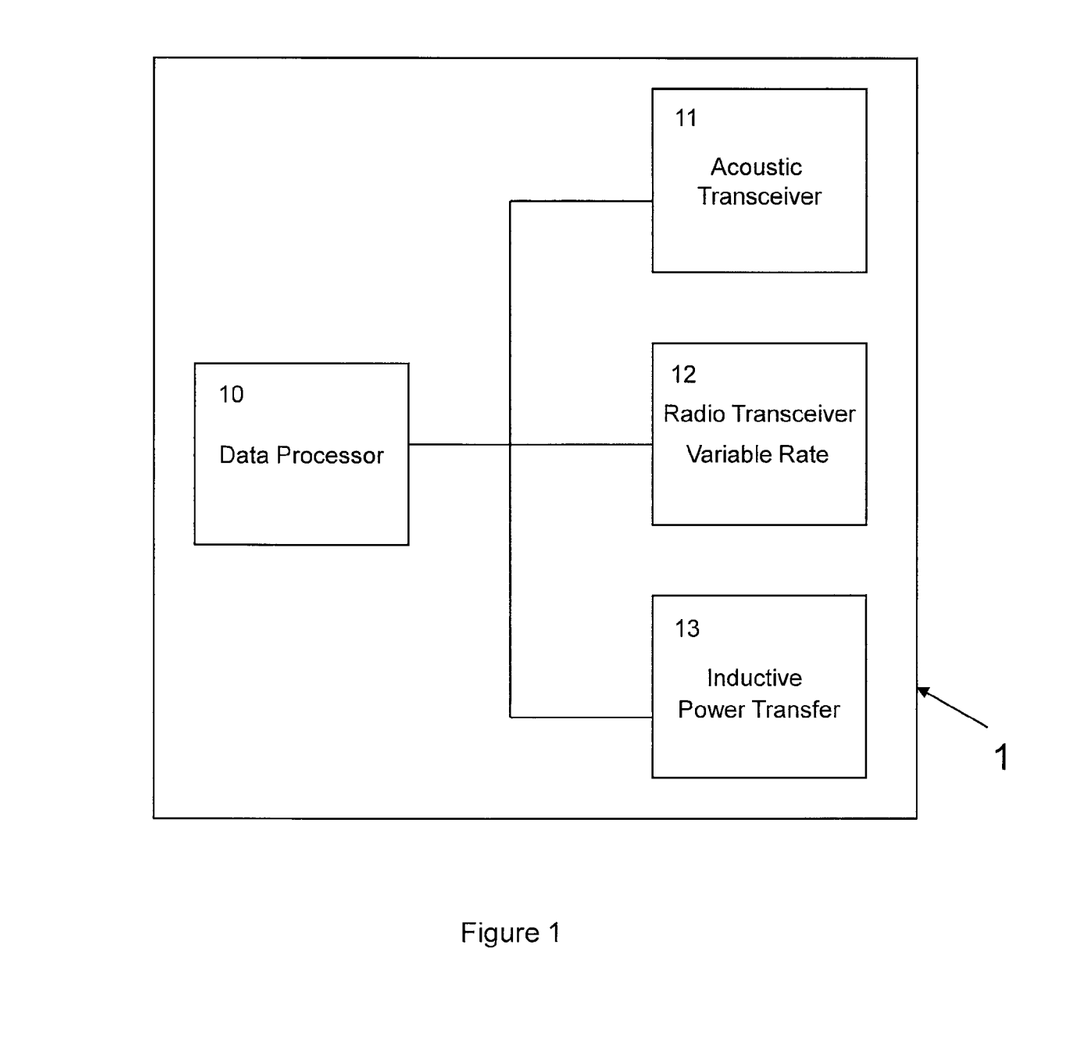
FIG. 1 shows a system diagram of a subsea transfer system according to an embodiment of the present invention.

FIG. 1 shows a system diagram of a subsea transfer subsystem 1 according to a first embodiment of the present invention. Data processor 10 controls interaction between the components of the system and executes algorithms for provisioning navigation and positioning capability. Acoustic transceiver 11 provides wireless communications and/or positioning signalling. Radio transceiver 12 provides variable data rate wireless communications and positioning signalling. Inductive power connector 13 allows transfer of electrical power from a mobile unit to a remotely deployed client system without the need for conductive contact.

The system shown in FIG. 1 functions as a conventional acoustic underwater communications system and/or underwater radio system with variable data rate adaptive to the channel conditions and/or combined acoustic-radio navigation system and/or radio navigation system and/or inductive power transfer system. The integrated system as shown in FIG. 1 can maximize communications and navigation availability over the wide range of conditions experienced in the underwater environment.

The present invention is designed to be interfaced to a wide range of subsea assets (both fixed and mobile) and sensors/data loggers to enable optimum wireless through-water communication in a range of situations. Similarly, the system as shown in FIG. 1 may be interfaced with a range of existing subsea radio or acoustic communications systems or another system of the present invention. Moreover, the system of the present invention allows power transfer to support remotely deployed equipment, for example sensors/data loggers, thus providing a coherent system. Such a feature is beneficial since the system described herein, without depending on a power cable allows, access to even the most hostile of underwater environments.

The system as shown in FIG. 1 provides a single unit which reliably provisions all the external requirements of a remotely deployed underwater system.

In various embodiments, the present invention utilizes underwater communication, navigation and power transfer sub-systems to provide an integrated subsea transfer system. As previously discussed, the sub-systems use electromagnetic, acoustic and inductive power techniques to provide an integrated system.

Figure 2:
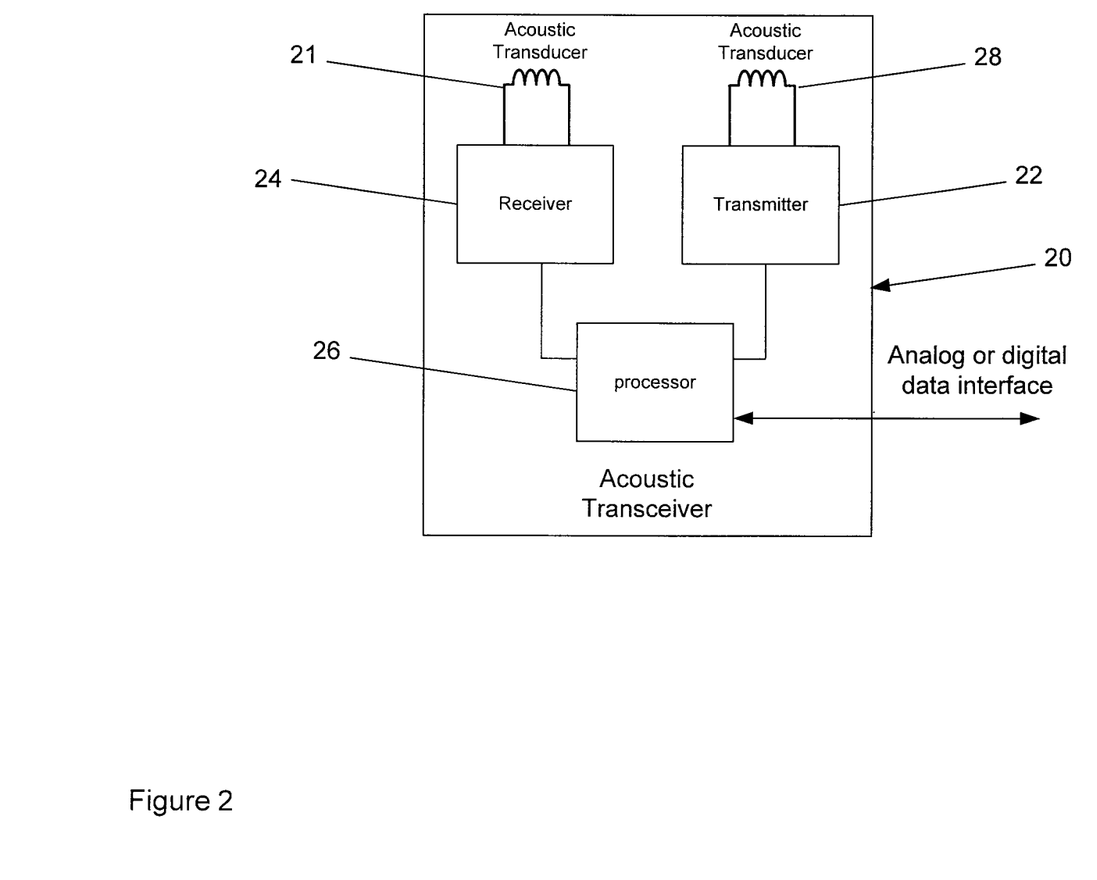
FIG. 2 shows a block diagram of a subsea acoustic transceiver according to an embodiment of the present invention.

FIG. 2 shows a block diagram of subsea transceiver 20 that has a transmitter 22, a receiver 24 and a processor 26 which can be connected to an analogue or digital data interface (not shown). This block diagram represents the components of a subsystem suitable for use as acoustic transceiver 11. Transmitter 22 and receiver 24 are provisioned with acoustic transducers 21 and 28 such as piezoelectric ceramic transducers.

Figure 3:
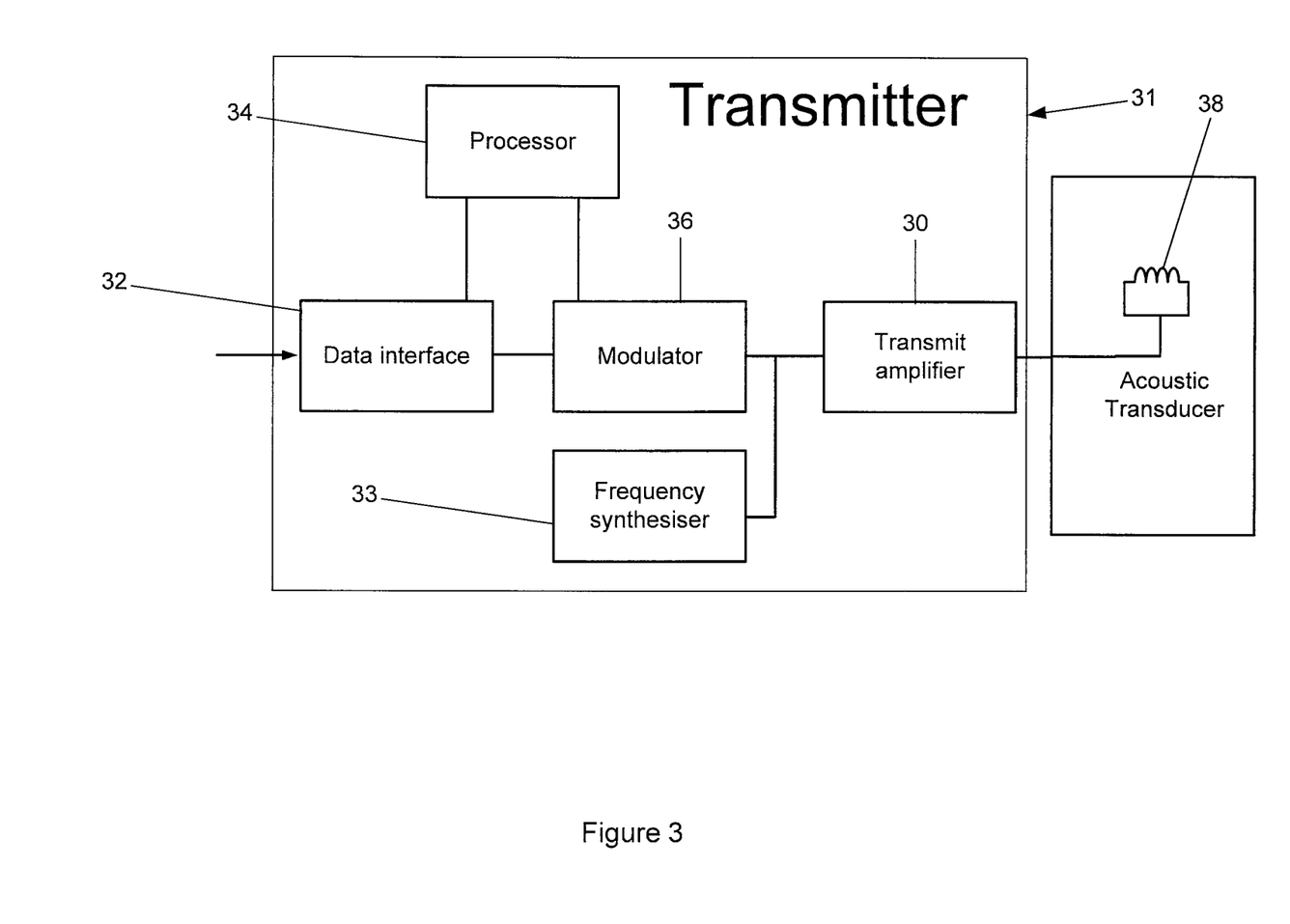
FIG. 3 shows a block diagram of an acoustic transmitter according to an embodiment of the present invention.

FIG. 3 shows an example of a transmitter 31 for use in acoustic transceiver 11 of FIG. 1 according to an embodiment of the present invention. This has data interface 32 that is connected to each of processor 34 and modulator 36. Modulator 36 is provided to encode data onto a carrier wave. An output of the modulator 36 is connected to frequency synthesizer 33 that provides a local oscillator signal for up-conversion of the modulated carrier and transmit amplifier 30, which is connected to acoustic transducer 38 as an example embodiment. In use, processor 34 is operable to cause communication signals to be transmitted via transducer 38 at a selected carrier frequency.

Figure 4:
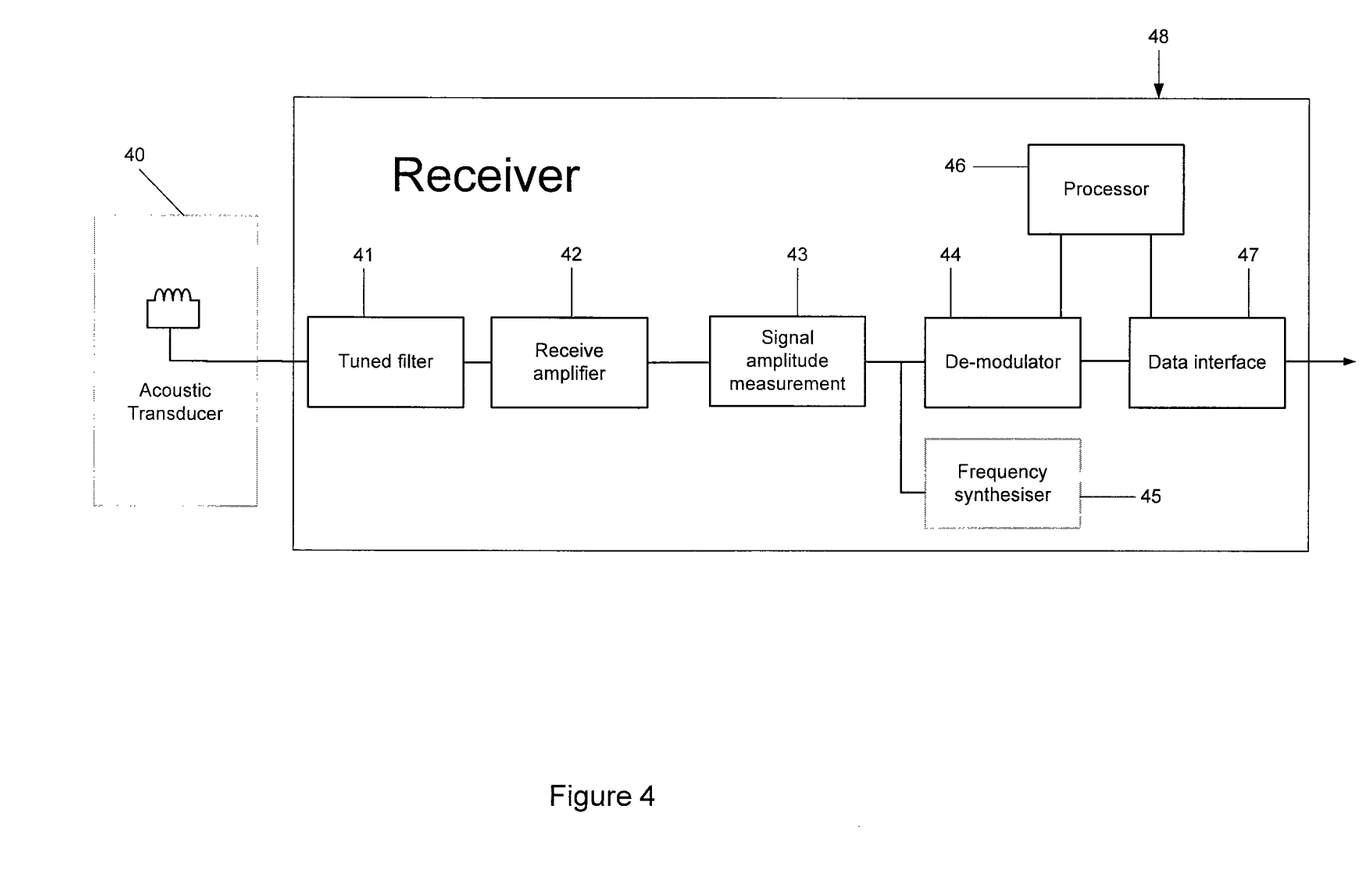
FIG. 4 shows a block diagram of an acoustic receiver according to an embodiment of the present invention.

FIG. 4 shows an example of a receiver 48 for use with acoustic transceiver 11 of FIG. 1. As with the transmitter, this has an acoustic transducer 40 adapted for underwater usage. This transducer is operable to receive acoustic signals generated by transmitter 31 as described in FIG. 3. a Tuned filter 41 is connected to transducer 40 and is in turn connected to a receive amplifier 42. At the output of amplifier 42 is a signal amplitude measurement module 43 that is coupled to de-modulator 44 and frequency synthesizer 45, which provides a local oscillator signal (not shown) for down conversion of the modulated carrier. Connected to the de-modulator 44 are processor 46 and data interface 47, which is also connected to processor 46. The data interface 47 shown in the current figure is provided for transferring data from receiver 48 to a control or monitoring means, such as another on-board processor, which may be located in the mobile device or at another remote location.

Figure 5:
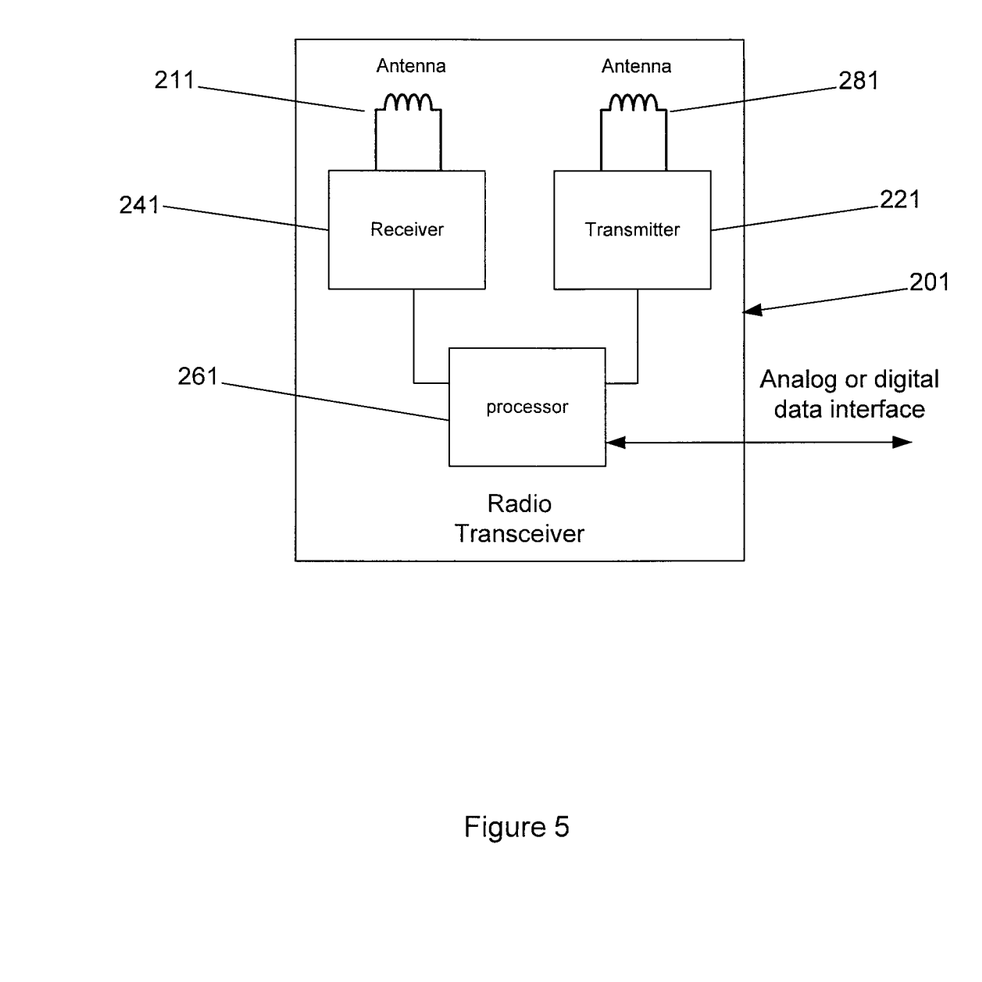
FIG. 5 shows a block diagram of a subsea radio transceiver according to an embodiment of the present invention.

FIG. 5 shows a block diagram of subsea transceiver 201 that comprises transmitter 221, receiver 241 and processor 261 which can be connected to an analogue or digital data interface (not shown). This block diagram represents the components of a subsystem suitable for use as radio transceiver 12. Transmitter 221 and receiver 241 have waterproof, electrically insulated magnetic coupled antenna transducers 211 and 281. A magnetic coupled transducer may be used since water is an electrically conducting medium, and so has a significant impact on the propagation of electromagnetic signals.

Figure 6:
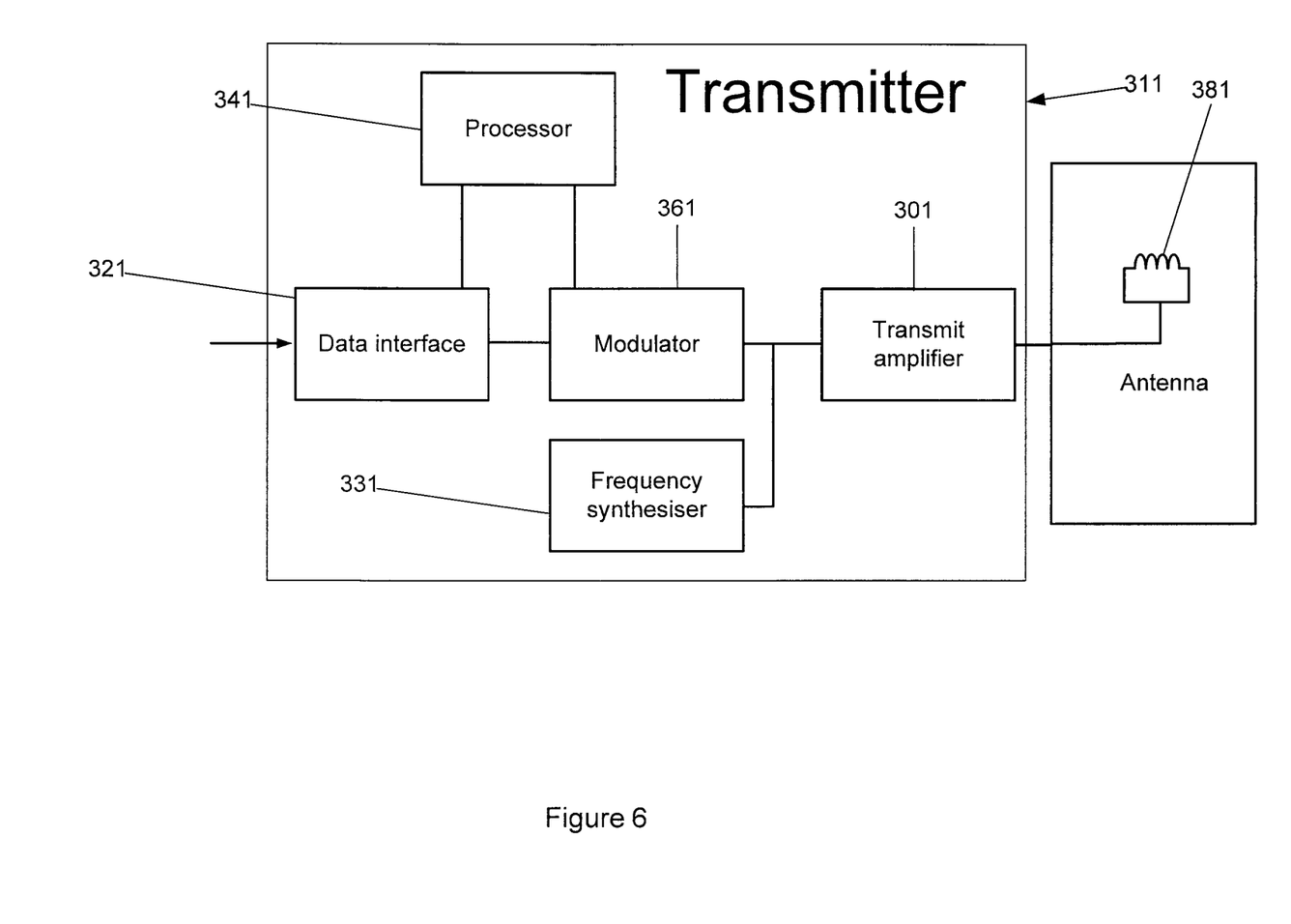
FIG. 6 shows a block diagram of a subsea radio transmitter according to an embodiment of the present invention.

FIG. 6 shows an example embodiment of transmitter 311 for use in the radio transceiver 12 of FIG. 1. Transmitter 311 has data interface 321 that is connected to each of a processor 341 and modulator 361. Modulator 361 is provided to encode data onto a carrier wave. An output of the modulator 361 is connected to a frequency synthesizer 331 that provides a local oscillator signal for up-conversion of the modulated carrier and a transmit amplifier 301, which is connected to the underwater, electrically insulated magnetic coupled transducer 381 as an example embodiment. In use, transmitter processor 341 is operable to cause electromagnetic communication signals to be transmitted via the transducer 381 at a selected carrier frequency.

Figure 7:
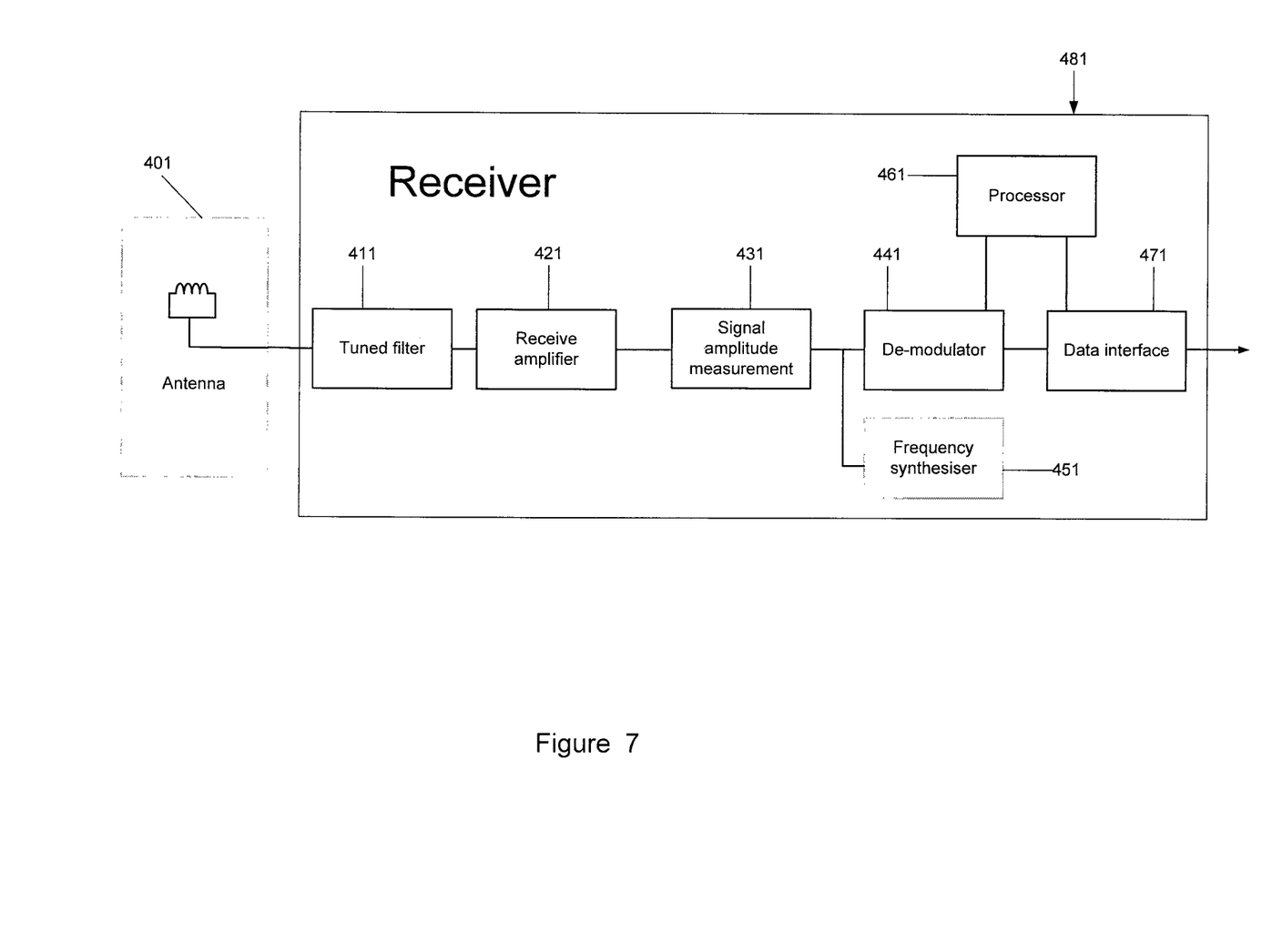
FIG. 7 shows a block diagram of a subsea radio receiver according to an embodiment of the present invention.

FIG. 7 shows an example of a radio receiver 481 for use with the transceiver 12 of FIG. 1. As with the transmitter, this has an electrically insulated magnetic antenna 401 adapted for underwater usage. Antenna 401 is operable to receive magnetic field signals from transmitter 311 as described in FIG. 6. Connected to transducer 401 is a tuned filter 411 that is in turn connected to receive amplifier 421. At the output of the amplifier 421 is a signal amplitude measurement module 431 that is coupled to de-modulator 441 and frequency synthesizer 451, which provides a local oscillator signal (not shown) for down conversion of the modulated carrier. Connected to the de-modulator 441 are processor 461 and data interface 471, which is also connected to processor 461. Data interface 471 shown in the current figure is provided for transferring data from the receiver 481 to a control or monitoring means, such as another on-board processor, which may be located in the mobile device or at another remote location.

Electrically insulated magnetic coupled transducer 211, 281 are used in the communication systems in which various embodiments of the present invention are embodied because in an underwater environment they are more efficient than electrically coupled transducers. Underwater attenuation is largely due to the effect of conduction on the electric field. Since electrically coupled transducers produce a higher electric field component, in water in the near field, the radiated signal experiences higher attenuation. In comparison a magnetic loop transducer produces strong magneto-inductive field terms in addition to the electromagnetic propagating field. The magneto-inductive terms are greater than the propagating field close to the transmitting transducer and provide an additional means for coupling a signal between two transducers. For both shorter and greater distances, magnetic coupled transducers are more efficient under water than electrically coupled. Signal attenuation in water increases as a function of increasing frequency and hence, minimizing the carrier frequency, allows the transmission distance to be maximized. In practice, the lowest achievable signal frequency will be a function of the desired bit rate and the required distance of transmission.

Figure 9:
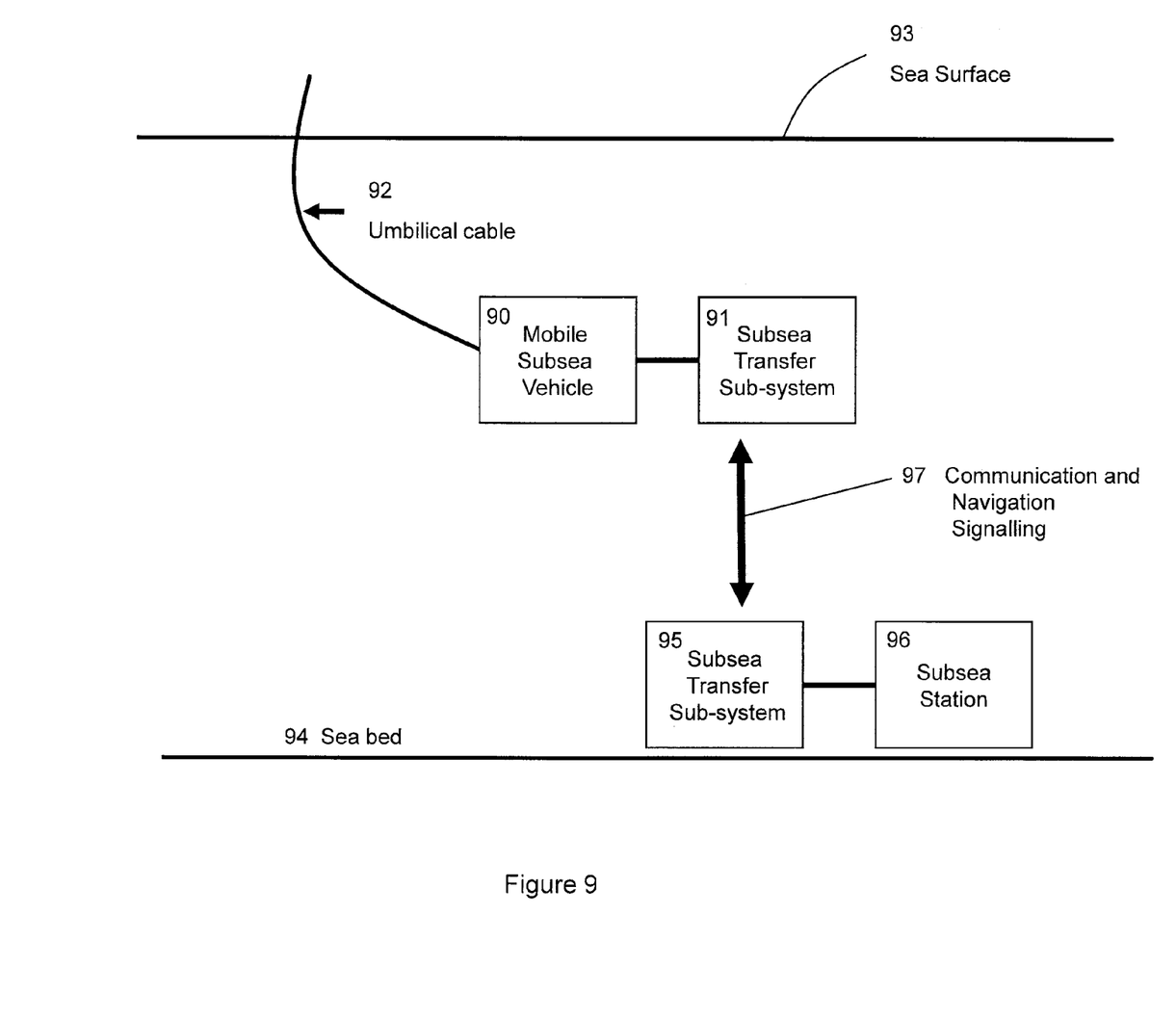
FIG. 9 shows a schematic diagram of a subsea transfer system for providing wireless data transfer, electrical power transfer and navigation between a mobile subsea vehicle and a deployed subsea station according to an embodiment of the present invention.

The electromagnetic communication sub-system of FIG. 2, in which embodiments of the invention are embodied, may be combined with an acoustic communication sub-system of FIG. 5 to provide enhanced capability as shown in FIG. 1. Whereas acoustic communications offer long-range capability they are limited in terms of robust operation in noisy environments and can only offer a limited bandwidth. The range of operation is limited with electromagnetic communications but it is immune to acoustic noise and has a wide bandwidth capability. By way of example, a system of the present invention can include an acoustic modem and an underwater electromagnetic communications system as described in the sub-systems above. The two sub-systems can be combined in the processor 10 of FIG. 1 to select the most appropriate communications carrier 97. That is to say, interaction between a first sub-system 91 and/or second sub-system 95 and depicted more clearly in FIG. 9 is controlled by means of processor 10. The criteria may include factors such as measured error rates, range of operation, quality of service, measured signal strength or required bandwidth.

Figure 8:
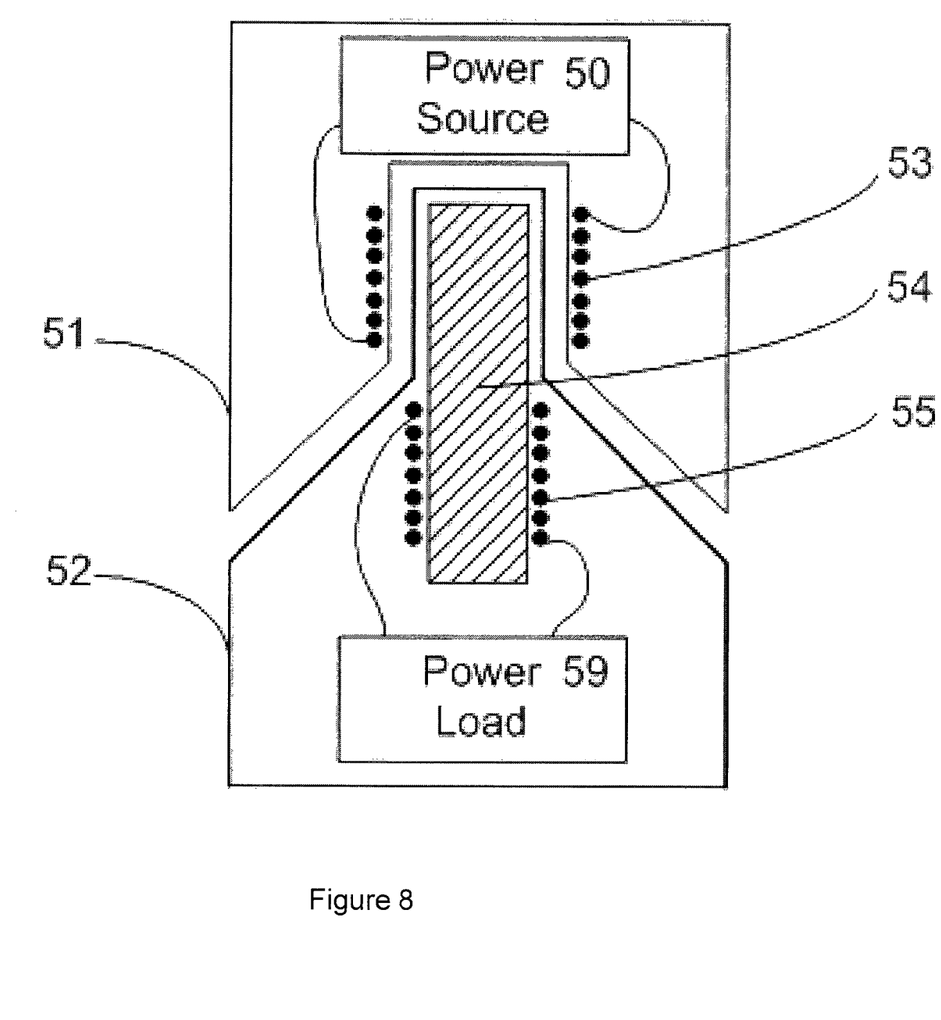
FIG. 8 shows a block diagram of an inductive power coupler according to an embodiment of the present invention.

FIG. 8 shows an example block diagram in cross section of an inductive power coupler system according to an embodiment of the present invention suitable for use in inductive power transfer subsystem 13. The inductive charging capability of the system of FIG. 1 allows units, or other devices such as sensors to which they are interfaced, to be recharged without making conductive contact, thus improving subsea connector reliability compared to prior art systems which rely on electrically conductive contact. Power source 50 generates an alternating current which is carried through primary coils 53. When the two halves of the connector are mated, as shown, solenoid core 54 is positioned within primary coils 53 so that current flowing through the primary coils 53 induces alternating magnetic flux in solenoid core 54 which in turn induces an alternating current in secondary coil 55. Power load 59 receives power from secondary coil 55. Primary housing 51 is shaped to guide the core within secondary housing 52 to rest inside primary coils 53 as the two halves of the inductive connector are brought together.

The distance between the primary and secondary coils should be minimised to maximise the mutual flux coupling since coupling efficiency follows an inverse relationship with distance when coupled through a non-magnetic medium. Such configuration allows the transfer of power and/or data between a mobile subsea vehicle and a subsea station as described later.

FIG. 9 shows a schematic diagram of a subsea transfer system for providing wireless data transfer, electrical power transfer and navigation between mobile subsea vehicle 90 and a deployed subsea station 96 according to an embodiment of the present invention.

In use, the system of the present invention integrates a coherent set of sub-systems 10 to 13 which are combined to achieve the functionality required to service remotely deployed underwater systems. Acoustic transceiver 11 can provide communications and navigation at maximum range through open water to guide mobile subsea vehicle 90 toward subsea station 96. As the mobile subsea vehicle 90, provisioned with subsea transfer subsystem 91, approaches the remotely deployed subsea station 96, provisioned with similar subsea transfer system 95, acoustic navigation becomes more problematic at short range. For example, close to a complex installation on the seabed radio signalling will often provide a better service for communications and navigation. The mobile subsea vehicle 90 may finally dock with subsea station 96 and the radio and acoustic subsystems 11, 12 allow positioning of mobile subsea vehicle 90 to allow inductive power transfer by means of inductive power transfer subsystem 13 to recharge the subsea station 96 equipment batteries of sensors/data loggers.

The embodiments of the present invention may be used for example in the case of an mobile subsea vehicle 90 approaching a subsea station 96 typically located on the sea bed 94. Subsea station 96 may, for example, comprise a Remotely Deployed Sensor (RDS) of a hydrocarbon production installation. In the following example description, the system of the present invention illustrates the system's utility and benefits of combining sub-systems 11, 12 and 13 to form a single system 1.

Although not shown in the present figure, such a remotely deployed sensor such as seismic sensor of subsea station 96 may be utilised near a hydrocarbon production installation. Such sensors are important to the safe operation of underwater explorations such that any trends in seismic shift are monitored and reported to exploration operators. Furthermore, and again typically, several sensors may be utilised in hydrocarbon production environments which collect several gigabytes of data on a regular basis. Clearly, given the harsh environmental conditions present underwater and for the reasons explained earlier, such data cannot be reliably and wirelessly communicated over a long range so requiring the reduction of communications range through movement of a mobile subsea vehicle. Furthermore, data loggers forming part of any underwater sensor system or subsea station 96 may require periodic battery power re-charging. Mobile subsea vehicle 90 may optionally be connected to a vehicle floating on sea surface 93 or hydrocarbon installation by means of at least an umbilical cable 92. Purpose of umbilical cable 92 is to provide control signals, power and so on to vehicle 90.

Mobile subsea vehicle 90 comprises a subsea transfer system 91 which comprises constituent parts as shown in detail in FIG. 1. That is to say vehicle 90 comprises a first acoustic transceiver 11 for providing wireless data communications and/or positioning signaling and a first radio transceiver for providing wireless data communications and/or position signaling 12 and a first inductive power connector 13. Furthermore, vehicle 90 also comprises a data processor 10 which primarily controls interaction between said parts 11-13 of subsea transfer system 91 and as will become apparent later, controls interaction between subsea transfer system 95.

Furthermore and as further depicted in the schematic view of the FIG. 9, subsea station 96 comprises a subsea transfer system 95 which comprises constituent parts as shown in detail in FIG. 1. That is to say, subsea station 96 comprises a second acoustic transceiver 11 for providing wireless data communications and/or positioning signaling, a second radio transceiver 12 for providing wireless data communications and/or position signaling and a second inductive power connector 13. As previously discussed, subsea station 96 comprising subsea transfer system 95 further comprises a data processor 10 which again primarily controls interaction between said parts 11-13 of system 95.

Typically in operation, vehicle 90 may initially rely on acoustic communications using subsea transfer system 91 and navigation at long range over communication channel 97 and by means of constituent parts 10-13 shown in figure. As vehicle 90 navigates to the acoustically noisy hydrocarbon installation, vehicle 90 would typically encounter the acoustically noisy hydrocarbon installation providing multiple acoustic reflections from, for example, metal pipe installations.

Data processor 10 of subsea transfer sub-system 91, 95 typically monitors the bit error rate of the system 1 and the quality of service available from transceivers 11, 12 and revert to a lower bit error rate for communications. Based on a set of predetermined criteria, data processor 10 may then switch to radio communications and navigation 12 over communications channel 97 with radio signalling provided at variable bit rate and carrier frequencies.

Such a handover or interaction between sub-systems transceivers 11-12 and sub-systems 91 and 95 and further the provision of navigation data allows vehicle 90 to be accurately navigated into a predetermined position. Further such accurate positioning of vehicle 90 allows precise mating of inductive connector 13, 51 to a corresponding part found on subsea station 96. Thus, interaction between vehicle 90 and subsea station 96 is provided allowing data collection, transfer of configuration commands to/from e.g. a sensor module (not shown) of subsea station 96. Furthermore, such docking of vehicle 90 to a subsea station 96 allows power charging thereof.

The present invention therefore ensures that such in interaction between the AUV 90 and subsea station 96 allows an efficient and manageable means of data and power transfer thus allowing the transfer of data from deep underwater to a control station located above water 93.

The system of the present invention provides a coherent set of capabilities which can be combined to achieve the functionality required to service remotely deployed underwater systems. The acoustic transceiver can provide communications and navigation at maximum range through open water to guide a vehicle provisioned with a second system of the present invention toward remotely deployed equipment. A means of providing a wireless data and wireless power transfer sensors, data loggers, control systems and for wireless AUV docking is also advantageously provided.

While the present invention may have particular applicability to Autonomous Underwater Vehicles approaching Remotely Deployed Sensors of a hydrocarbon production installation, it should be noted that the present invention is also applicable to other types of underwater applications where the transfer of signals between a control station and sensors in a hostile underwater environment is required.

Various embodiments of the invention have been described above. The descriptions are intended to be illustrative, not limitative. Thus, it will be apparent to one skilled in the art that certain modifications may be made to the invention as described without departing from the scope of the claims set out below.

What is claimed is:

1. A subsea transfer system comprising:
   a mobile subsea vehicle further comprising:
   a first acoustic transceiver for providing wireless data communications and/or positioning signaling;
   a first radio transceiver for providing wireless data communications and/or position signaling;
   a first inductive power connector and a first data processor for controlling interaction between said first acoustic transceiver, said first radio transceiver and said first inductive power connector and a subsea station further comprising:
- a second acoustic transceiver for providing wireless data communications and/or positioning signaling;
- a second radio transceiver for providing wireless data communications and/or position signaling;
- a second inductive power connector
- and a second data processor for controlling interaction between said second acoustic transceiver, said second radio transceiver and said second inductive power connector wherein, during use, said subsea transfer system provides wireless data transfer, electrical power transfer and navigation between said mobile subsea vehicle and said subsea station and further wherein, during use, said first and second data processors are operable to select between said acoustic transceiver system or said radio transceiver system for use in data communications and/or navigation based on the quality of service available from each transceiver and further wherein, during use, navigation data provided by radio and/or acoustic transceivers is operable to achieve docking of said first and said second inductive power connectors to allow transfer of electrical power between said mobile subsea vehicle and said subsea station.

2. A subsea transfer system according to claim 1, wherein selection of radio or acoustic data transfer is based on a comparison of the measured bit error rates of the two transceiver systems.

3. A subsea transfer system according to claim 1, wherein selection of radio or acoustic data transfer is based on the range of operation between said mobile subsea vehicle and said subsea station.

4. A subsea transfer system according to claim 1, wherein selection of radio or acoustic navigation is based on the range of operation between said mobile subsea vehicle and said subsea station.

5. A subsea transfer system according to claim 1, wherein selection of radio or acoustic navigation is based on a comparison of the measured received signal strength of the two transceiver systems.

6. A subsea transfer system according to claim 1, wherein selection of radio or acoustic navigation is based on the positional accuracy required between said mobile subsea vehicle and said subsea station.

7. A subsea transfer system according to claim 1, wherein said radio transceiver system and said acoustic transceiver system are operable to transfer data simultaneously.

8. A subsea transfer system according to claim 1, wherein said radio transceiver system and said acoustic transceiver system are operable to provide navigation data simultaneously.

9. A subsea transfer system according to claim 1, wherein said radio transceiver system provides variable data rate communications.

10. A subsea transfer system according to claim 1, wherein said acoustic transceiver system provides variable data rate communications.

11. A subsea transfer system according to claim 1, wherein said acoustic transceiver system operates using acoustic signals with a frequency between 1 kHz and 100 kHz.

12. A subsea transfer system according to claim 1, wherein said radio transceiver system operates using radio signals with a frequency between 1 Hz and 100 MHz.

13. A subsea transfer system according to claim 1, wherein said acoustic transceiver system provides communications and/or navigation signaling at a range up to 10 km.

14. A subsea transfer system according to claim 1, wherein said radio transceiver system provides communications and/or navigation signaling at a range up to 1 km.

15. A subsea transfer system according to claim 1, wherein said mobile subsea vehicle is operable to provision wireless data transfer, electrical power transfer and navigation to multiple subsea stations.

16. A subsea transfer system according to claim 1, wherein said mobile subsea vehicle is operable to provision wireless data transfer, electrical power transfer and navigation to a subsea station that is in communication with a surface station.

17. A subsea transfer system according to claim 1, wherein said mobile subsea vehicle is operable to transfer electrical power to said subsea station.

18. A subsea transfer system according to claim 1, wherein said mobile subsea vehicle is operable to receive electrical power from said subsea station.

19. A subsea transfer system according to claim 1, wherein said mobile subsea vehicle is operable to transfer data to said subsea station.

20. A subsea transfer system according to claim 1, wherein said mobile subsea vehicle is operable to receive data from said subsea station.

21. A subsea transfer system according to claim 1, wherein said subsea station further comprises at least one remotely deployed sensor.

22. A subsea transfer system according to claim 1, wherein radio data communication between said mobile subsea vehicle and said subsea station is achieved at least partially through radio signals passing through the seabed.

* * * * *